UNITED STATES PATENT OFFICE.

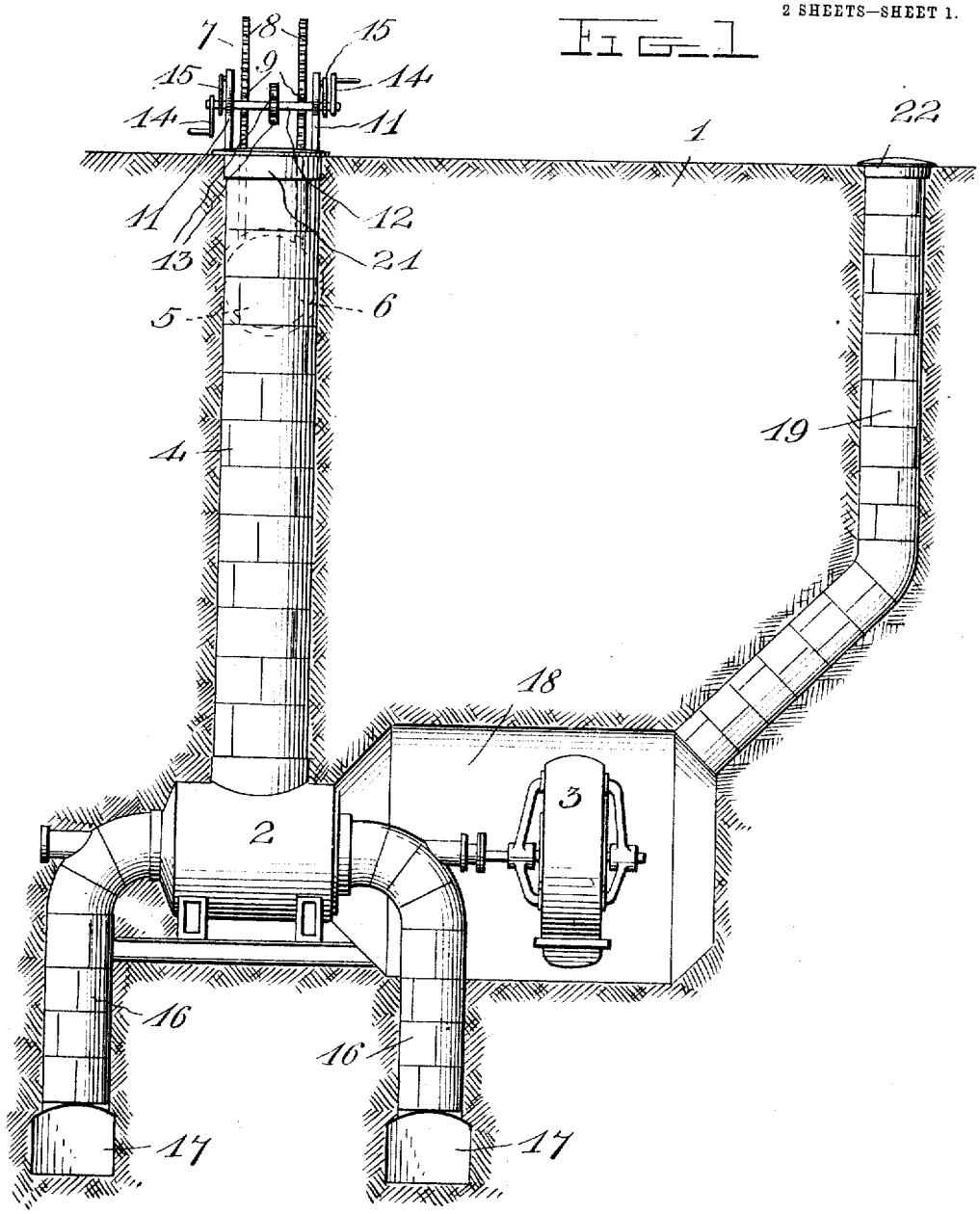

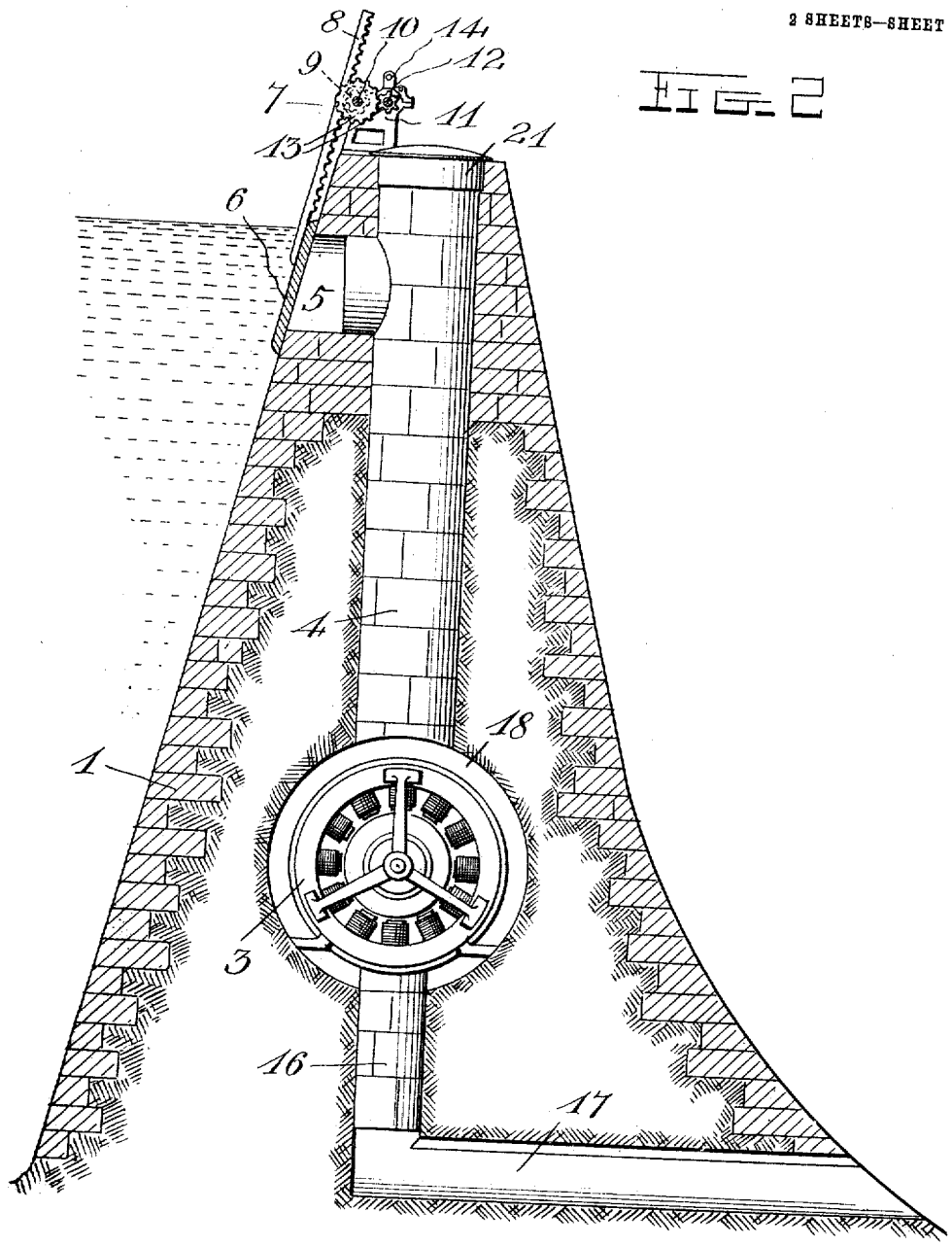

FRANK YEOMAN, OF OROVILLE, CALIFORNIA.

POWER PLANT.

No. 842,368.   Specification of Letters Patent.   Patented Jan. 29, 1907.

Application filed October 16, 1905. Serial No. 283,059.

*To all whom it may concern:*

Be it known that I, FRANK YEOMAN, a citizen of the United States, residing at Oroville, in the county of Butte and State of California, have invented certain new and useful Improvements in Power Plants; and I do declare the following to be a full, clear, and exact description of the invention, such as will enable others skilled in the art to which it appertains to make and use the same.

My invention relates to improvements in power plants of the hydro-electric type.

The object of the invention is to provide a power plant of this character which will be so disposed in the wall of a dam, canyon, or any other similar place in which a body of water is confined so that it cannot be injured or in any way affected by the undue rise of the river, stream, pond, lake or other body of water.

With the above and other objects in view the invention consists of certain novel features of construction, combination, and arrangement of parts, as will be hereinafter described and claimed.

In the accompanying drawings, Figure 1 is a vertical longitudinal sectional view through the wall of a dam or the like, showing one embodiment of my invention; and Fig. 2 is a vertical transverse sectional view through the same.

In the practice of my invention I mount in the wall of a dam, canyon, or the like 1, which confines a body of water, one or more water wheels or turbines 2, which I connect to electric generators 3. The water-turbines 2 and the generators 3 may be of any desired form and construction and may be connected direct, as shown in Fig. 1 of the drawings, or in any other suitable manner. As shown, the turbine 2 is mounted adjacent to the lower end of a well 4, which is formed in the wall 1 and has adjacent to its upper end an intake-opening 5. The amount of water passing through said intake may be controlled in any suitable manner. As shown, a sliding gate 6 is provided and operated by mechanism 7, mounted upon the top of the wall. This mechanism 7 comprises two rack-bars 8, which are secured to the top of the gate 6 and engage pinions 9 upon a shaft 10, mounted in suitable bearings 11. In said bearings is also mounted a parallel shaft 12, which is connected to the shaft 10 by a pair of meshing gears 13 and which has upon its ends crank-handles 14 and pawl-and-ratchet locking devices 15. It will be seen that when the crank-handles 14 are rotated the gate 6 may be raised and lowered to open and close the intake 5.

The water passing through the well 4 enters the turbine-casing and is discharged from each end of the latter through discharge-passages 16, which open into horizontally-disposed outlet-passages 17, which extend transversely of the wall 1.

The electric generator 3, as clearly shown in Fig. 2 of the drawings, is mounted in a chamber 18, formed in the wall 1, adjacent to the lower end of the well. Access is had to said chamber through a manway or passage 19, which leads from the upper portion of said chamber to the top of the wall. The top of the well 4 and the top of the passage 19 may be closed by caps or covers 21 22. The walls of the well, chamber, and other passageways may be constructed of metal, masonry, or any suitable material.

The manner of practicing my invention and the advantages thereof will be readily understood from the foregoing description, taken in connection with the accompanying drawings. It will be seen that by mounting the direct connected power units in the water-tight compartments in the wall of a dam, canyon, or the like said parts will be protected, so that they cannot be injured by any undue rise of the water confined by such dam or wall.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

A power plant comprising a wall having a well open at its upper end at the top of the wall, provided with a water-inlet opening near its upper end, a chamber at the bottom of the well, a passage leading from said chamber to the top of the wall, water-discharge passages leading downwardly and outwardly from said chamber, a turbine having its casing in said chamber at the lower end of and communicating with the well, discharge-pipes leading from the turbine-casing to the discharge-passages, an electric generator in the chamber connected to and driven by the turbine, closures for the upper ends of the well and of the passage which leads upwardly from the chamber, and a gate to open and close the water-inlet opening, substantially as described.

In testimony whereof I have hereunto set my hand in presence of two subscribing witnesses.

FRANK YEOMAN.

Witnesses:
J. L. WYCKOFF,
J. H. BOWERS.